(12) United States Patent
Wang et al.

(10) Patent No.: US 10,853,429 B2
(45) Date of Patent: Dec. 1, 2020

(54) IDENTIFYING DOMAIN-SPECIFIC ACCOUNTS

(71) Applicant: FUJITSU LIMITED, Kawasaki (JP)

(72) Inventors: Jun Wang, San Jose, CA (US); Kanji Uchino, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 202 days.

(21) Appl. No.: 15/710,660

(22) Filed: Sep. 20, 2017

(65) Prior Publication Data

US 2019/0087499 A1    Mar. 21, 2019

(51) Int. Cl.
| | |
|---|---|
| *G06F 16/9535* | (2019.01) |
| *G06F 16/2457* | (2019.01) |
| *G06Q 50/00* | (2012.01) |
| *G06F 16/901* | (2019.01) |
| *G06F 16/248* | (2019.01) |
| *H04L 29/08* | (2006.01) |
| *H04W 4/08* | (2009.01) |

(52) U.S. Cl.
CPC .... *G06F 16/9535* (2019.01); *G06F 16/24578* (2019.01); *G06F 16/248* (2019.01); *G06F 16/24575* (2019.01); *G06F 16/9024* (2019.01); *G06Q 50/01* (2013.01); *H04L 67/306* (2013.01); *H04W 4/08* (2013.01)

(58) Field of Classification Search
CPC ........... G06F 16/9535; G06F 16/24578; G06F 16/9024; G06F 17/2785; G06F 16/24575; G06F 16/248; G06F 16/285; G06F 16/335; G06F 11/3438

USPC ................ 707/723, 740, 748, 709, 710, 737
See application file for complete search history.

(56) References Cited

U.S. PATENT DOCUMENTS

| | | | |
|---|---|---|---|
| 9,397,974 B1 * | 7/2016 | Gross | H04L 51/32 |
| 9,424,612 B1 * | 8/2016 | Bright | G06Q 50/01 |
| 10,229,163 B1 * | 3/2019 | Kolcz | H04L 67/306 |
| 10,296,913 B1 * | 5/2019 | Breitman | G06F 16/288 |
| 2010/0262610 A1 * | 10/2010 | Acosta | G06F 16/3334 707/748 |
| 2014/0025692 A1 * | 1/2014 | Pappas | G06F 16/00 707/754 |

(Continued)

OTHER PUBLICATIONS

Ke, Q., Ahn, Y. Y., & Sugimoto, C. R. (Apr. 11, 2017). A systematic identification and analysis of scientists on Twitter. PloS one, 12(4), e0175368.

(Continued)

*Primary Examiner* — Dangelino N Gortayo
(74) *Attorney, Agent, or Firm* — Maschoff Brennan

(57) ABSTRACT

A method of identifying domain-specific accounts is provided. A method may include identifying a plurality of candidate accounts based on a plurality of seed accounts. The method may further include identifying a subset of candidate accounts of the plurality of candidate accounts based on one more account statistics. Further, the method may include clustering each candidate account of the subset of candidate accounts into either a non-domain-specific cluster or a domain-specific cluster based on a plurality of account statistics. The method may also include updating, at least one of the plurality of candidate accounts and the plurality of seed accounts based on at least one of the non-domain-specific cluster and the domain-specific cluster.

20 Claims, 7 Drawing Sheets

(56) References Cited

U.S. PATENT DOCUMENTS

| | | | | |
|---|---|---|---|---|
| 2014/0136521 A1* | 5/2014 | Pappas | ............... | G06Q 50/01 707/722 |
| 2014/0236953 A1* | 8/2014 | Rapaport | ............... | G06Q 10/10 707/740 |
| 2015/0081725 A1* | 3/2015 | Ogawa | ............... | G06Q 50/01 707/754 |
| 2015/0120713 A1* | 4/2015 | Kim | ............... | G06F 16/9535 707/723 |
| 2015/0120782 A1* | 4/2015 | Kim | ............... | H04L 67/10 707/798 |
| 2015/0334072 A1* | 11/2015 | Agarwal | ............... | G06Q 50/01 715/753 |
| 2016/0117397 A1* | 4/2016 | Bansal | ............... | G06F 16/9535 707/723 |
| 2016/0378736 A1* | 12/2016 | Byron | ............... | G06F 3/0484 715/234 |
| 2017/0220577 A1* | 8/2017 | Pal | ............... | G06F 16/24578 |
| 2017/0235836 A1 | 8/2017 | Wang et al. | | |
| 2018/0150571 A1* | 5/2018 | Douglas | ............... | H04L 67/306 |
| 2019/0087915 A1* | 3/2019 | DeLuca | ............... | G06Q 30/0631 |

OTHER PUBLICATIONS

Wang, J., Xiang, J., Zhang, Y., & Uchino, K. (Sep. 2017). Mining Domain-Specific Accounts for Scientific Contents from Social Media. In International Conference on Web-Based Learning (pp. 111-118). Springer, Cham.

Mehler, A., & Skiena, S. (Mar. 26, 2009). Expanding network communities from representative examples. ACM Transactions on Knowledge Discovery from Data (TKDD), 3(2), 7.

Kloumann, I. M., & Kleinberg, J. M. (Aug. 2014). Community membership identification from small seed sets. In Proceedings of the 20th ACM SIGKDD international conference on Knowledge discovery and data mining (pp. 1366-1375). ACM.

Jäschke, R. Identifying and Analyzing Researchers on Twitter. (Jun. 23, 2014).

* cited by examiner

IDENTIFYING DOMAIN-SPECIFIC ACCOUNTS

FIELD

The embodiments discussed herein relate to identifying domain-specific accounts via seed expansion.

BACKGROUND

With the advent of computer networks, such as the Internet, and the growth of technology, more and more information is available to more and more people. For example, many leading researchers are sharing information and exchanging ideas timely using social media.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include identifying a plurality of candidate accounts based on a plurality of seed accounts. The method may further include identifying a subset of candidate accounts of the plurality of candidate accounts based on one more account statistics. Further, the method may include clustering each candidate account of the subset of candidate accounts into either a non-domain-specific cluster or a domain-specific cluster based on a plurality of account statistics. The method may also include updating, at least one of the plurality of candidate accounts and the plurality of seed accounts based on at least one of the non-domain-specific cluster and the domain-specific cluster.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Various embodiments discussed herein relate to using domain-specific accounts (e.g., seeds accounts) to identify additional domain-specific accounts (e.g., via seed expansion). Further, various embodiments may include analyzing social networks to identify experts based on, for example, crowd intelligence of one or more identified domain-specific accounts.

The current fast-pace of technology, research, and general knowledge creation has resulted in previous and current methods of knowledge dissemination is inadequate for providing up-to-date knowledge and information on recent developments. Further, knowledge is no longer generated by a few select individuals in select regions. Rather, researchers, professors, experts, and others with knowledge of a given topic, referred to in this disclosure as knowledgeable people, are located around the world and are constantly generating and sharing new ideas.

As a result of the Internet, however, this vast wealth of newly created knowledge from around the world is being shared worldwide in a continuous manner. In some circumstances, this vast knowledge is being shared through social media. For example, knowledgeable people may share knowledge recently acquired through blogs, micro-blogs, and other social media.

Knowing that current information is being shared on social media does not result in the current information being readily accessible or that an individual could realistically access the information. In some fields, there may be thousands, tens of thousands, or hundreds of thousands of knowledgeable people. There is no database that includes the names of knowledgeable people from a specific field. However, even if a database included the names, the time spent for a person to determine if the knowledgeable people have social media accounts would be unreasonable for anyone to consider.

In short, due to the rise of computers and the Internet, mass amounts of information (e.g., content) is available, but there is no realistic way for a person to reasonably access the information. Some embodiments described herein relate to identifying domain-specific accounts, and identifying additional domain-specific accounts via seed expansion. Further, some embodiments may include identifying experts based on identified domain-specific accounts. Thus, various embodiments of the present disclosure provide a technical solution to a problem that arises from technology that could not reasonably be performed by a person, and various embodiments disclosed herein are rooted in computer technology in order to overcome the problems and/or challenges described above. Further, at least some embodiments disclosed herein may improve computer-related technology by allowing computer performance of a function not previously performable by a computer.

Embodiments of the present disclosure will be explained with reference to the accompanying drawings.

Figure 1:
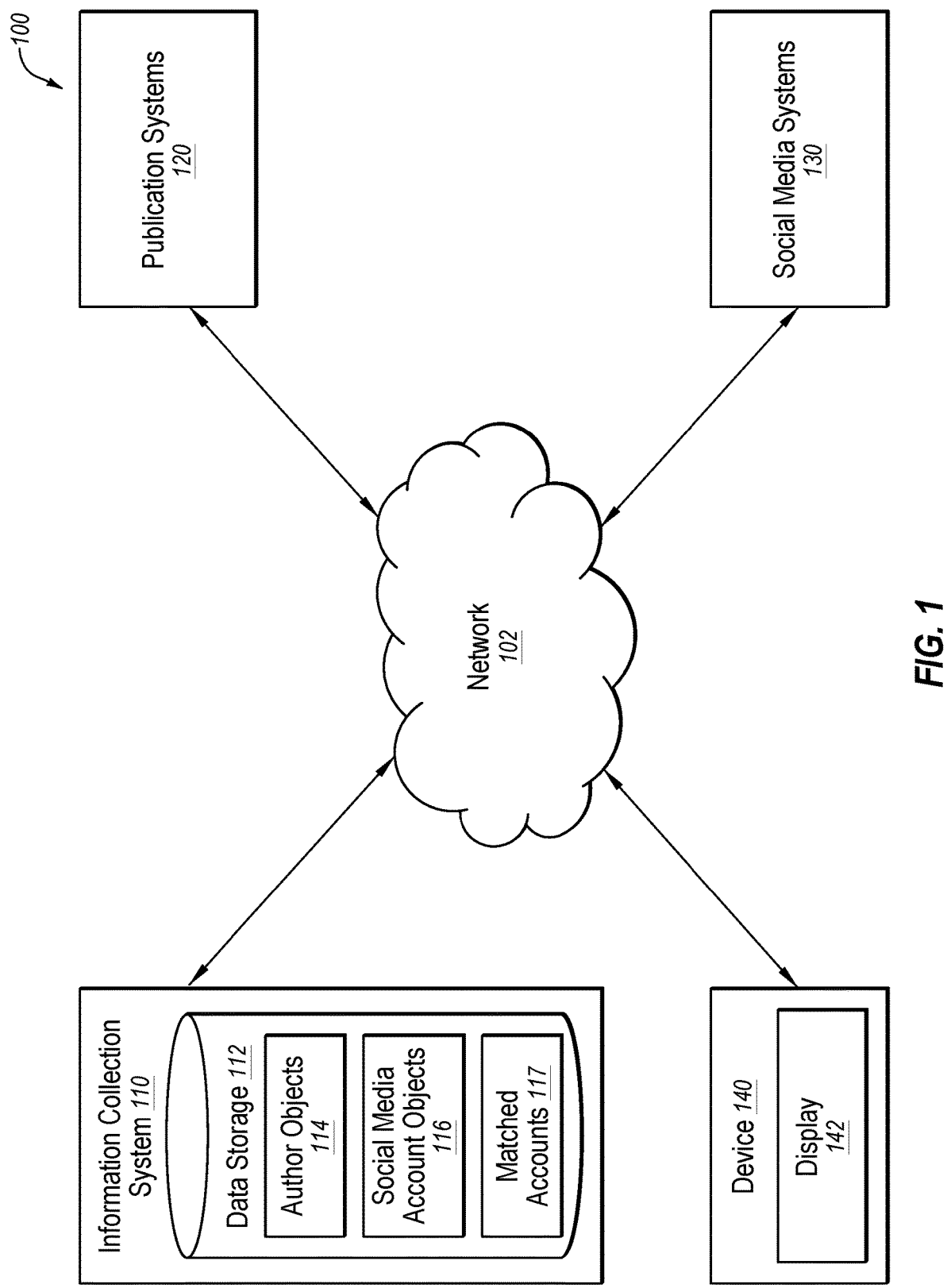
FIG. 1 is a diagram representing an example system configured to identify domain-specific accounts.

FIG. 1 is a diagram representing an example system 100, arranged in accordance with at least one embodiment described in the disclosure. System 100 may include a network 102, an information collection system 110, publication systems 120, social media systems 130, and a device 140.

Network 102 may be configured to communicatively couple information collection system 110, publication systems 120, social media systems 130, and device 140. In some embodiments, network 102 may be any network or configuration of networks configured to send and receive communications between devices. In some embodiments, network 102 may include a conventional type network, a wired or wireless network, and may have numerous different configurations. Furthermore, network 102 may include a local area network (LAN), a wide area network (WAN) (e.g., the Internet), or other interconnected data paths across which multiple devices and/or entities may communicate. In some embodiments, network 102 may include a peer-to-peer network. Network 102 may also be coupled to or may include portions of a telecommunications network for sending data in a variety of different communication protocols. In some embodiments, network 102 may include Bluetooth® communication networks or cellular communication networks for sending and receiving communications and/or data including via short message service (SMS), multimedia messaging service (MMS), hypertext transfer protocol (HTTP), direct data connection, wireless application protocol (WAP), e-mail, etc. Network 102 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. Further, network 102 may include one or more IEEE 802.11 wireless networks.

In some embodiments, any one of information collection system 110, publication systems 120, and social media systems 130, may include any configuration of hardware, such as servers and databases that are networked together and configured to perform a task. For example, information collection system 110, publication systems 120, and social media systems 130 may each include multiple computing systems, such as multiple servers, that are networked together and configured to perform operations as described in this disclosure. In some embodiments, any one of information collection system 110, publication systems 120, and social media systems 130 may include computer-readable-instructions that are configured to be executed by one or more devices to perform operations described in this disclosure.

Information collection system 110 may include a data storage 112. Data storage 112 may be a database in information collection system 110 with a structure based on data objects. For example, data storage 112 may include multiple data objects with different fields. In some embodiments, data storage 112 may include author objects 114, social media account objects 116, and matched accounts 117 (also referred to herein as "accounts," "matched accounts as sensors," "seeds," or "social media accounts"). In some embodiments, matched accounts 114 may be identified based on author objects 114 and/or social media account objects 116.

An example method of identifying matched accounts 114 is described with respect to U.S. patent application Ser. No. 15/236,183, including, for example, FIG. 2. The entirety of U.S. patent application Ser. No. 15/236,183 is hereby incorporated by reference.

In general, information collection system 110 may be configured to obtain author information of publications, such as articles, lectures, and other publications from publication systems 120. Using the author information, information collection system 110 may determine social media accounts associated with the authors and pull information from the social media accounts from social media systems 130. Information collection system 110 may organize and provide the information from the social media accounts to device 140 such that the information may be presented (e.g., to a user) on a display 142 of device 140.

Publication systems 120 may include multiple systems that host articles, publications, journals, lectures, and other digital documents. The multiple systems of publication systems 120 may not be related other than they all host media that provides information. For example, one system of the publication systems 120 may include a university website that host lectures and papers of a professor at the university. Another of publication systems 120 may be a website that host articles published in journals or conferences. In these and other embodiments, publication systems 120 may not share a website, a server, a hosting domain, or an owner.

In some embodiments, information collection system 110 may access one or more of publication systems 120 to obtain digital documents from publication systems 120. Using the digital documents, information collection system 110 may obtain information about the authors of the digital documents and topics of the digital documents. In some embodiments, for each author of a digital document, information collection system 110 may create an author object 114 in data storage 112. In created author object 114, information collection system 110 may store information about the author obtained from the digital document. The information may include a name, profile (e.g., description of the author), an image, and co-authors of the digital document. Information collection system 110 may also determine topics of the digital document. The topics of the digital document may be stored in author object 114.

In some embodiments, multiple digital documents from publication systems 120 may include the same author. In these and other embodiments, author object 114 for the author may be updated and/or supplemented with information from the other digital documents. For example, the topics from the other digital documents may be stored in author object 114. In some embodiments, the topics of all of the digital documents of an author obtained by information collection system 110 may be stored in author object 114.

After creating author objects 114, information collection system 110 may be configured to determine social media accounts for each of the authors in author objects 114. Information collection system 110 may determine social media accounts by accessing social media systems 130.

In some embodiments, each of social media systems 130 may be a system configured to host a different social media. For example, one of social media systems 130 may be a microblog social media system. Another of social media systems 130 may be a blogging social media system. Another of social media systems 130 may be a social network or other type of social media system.

Information collection system 110 may request each of social media systems 130 to search its respective social media accounts for the names of each author in author objects 114. For example, information collection system 110 may include thousands, tens of thousands, or hundreds of thousand author objects 114, where each author objects 114 includes the name of one author. In this example, there may be four social media systems 130 in which authors may share information. The number of social media systems 130 may be more of less than four. In these and other embodiments, information collection system 110 may request a search be performed in each of the four social media systems 130 using the name of the author associated with each author objects 114. Thus, if there were four social media systems 130 and 100,000 authors, then information collection system 110 would request 400,000 searches. Social media systems 130 may provide the results of the searches to information collection system 110. In these and other embodiments, the results of the searches may be links and/or network addresses of social media accounts with an owner that has a name that at least partially matches the names of the authors of author objects 114.

Using the links and/or network addresses of the social media accounts from the search, information collection system 110 may request the social media accounts. The information collection system 110 may also create a social media account object 116 for each of the social media accounts. To create social media account objects 116, information collection system 110 may pull information from the social media accounts and store the information in social media account objects 116. Social media account objects 116 may include information about the person associated with the social media account, such as a name, profile data (e.g., description of the person), image, and social media contacts. Information collection system 110 may also obtain topics of the posts in the social media accounts which may also be stored in social media account objects 116.

Information collection system 110 may compare the information from author objects 114 with the information from social media account objects 116 to determine the social media accounts associated with the authors in author objects 114. For example, for a given author object 114, the search of social media systems 130 may result in twenty-five accounts. Social media account objects 116 of the twenty-five accounts may be compared to the given author object 114 to determine which of the twenty-five accounts is associated with the author of the given author object 114. In some embodiments, an author may be associated with a social media account when the author is the owner of the social media account.

After matching social media accounts with authors from the digital documents from publication systems 120, information collection system 110 may obtain information (e.g., content) from the matching social media accounts. In these and other embodiments, information collection system 110 may request the social media accounts and parse the social media accounts to obtain the information from the social media accounts. Information collection system 110 may collate the information from the social media accounts and organize the information to provide the information to users of information collection system 110. For example, information collection system 110 may provide the information to device 140.

Device 140 may be associated with a user of information collection system 110. In these and other embodiments, device 140 may be any type of computing system. For example, device 140 may be a desktop computer, tablet, mobile phone, smart phone, or some other computing system. Device 140 may include an operating system that may support a web browser. Through the web browser, device 140 may request webpages from information collection system 110 that include information collected by information collection system 110 from the social media accounts of social media systems 130. The requested webpages may be displayed on display 142 of device 140 for presentation to a user of device 140.

Modifications, additions, or omissions may be made to system 100 without departing from the scope of the present disclosure. For example, system 100 may include multiple other devices that obtain information from information collection system 110. Alternately or additionally, system 100 may include one social media system.

In one or more embodiments, the present disclosure may include the use of social media accounts (e.g., as sensors) for identifying other knowledgeable social media accounts. For example, in determining whether a social media account is associated with a knowledgeable person, the social media accounts following and/or followed by a social media account may be analyzed. One or more embodiments of the present disclosure may leverage the ability of knowledgeable people to recognize and seek information from others who are knowledgeable on a particular topic. For example, a professor who publishes on machine learning may follow or be followed on social media by other people knowledgeable about machine learning. Additionally, those accounts followed by knowledgeable people may be more likely to be accounts of persons knowledgeable on a given topic than accounts following a knowledgeable person. For example, graduate students may follow a particular professor known to be knowledgeable on a given topic, but that may not mean that the particular professor considers insight from the graduate student as knowledgeable. By analyzing and utilizing the links in seed social media accounts of known knowledgeable people, the seed social media accounts may function as sensors in identifying social media accounts of other knowledgeable people. In some embodiments, various sets of candidate social media accounts may be generated and then analyzed to determine whether or not the candidates are knowledgeable accounts or may be included in some other category, such as a learner social media account. A knowledgeable social media account may refer to a social media account associated with a person who is knowledgeable on a given topic. A learner social media account may refer to a social media account associated with a person who is interested in a given topic but may or may not be knowledgeable on the given topic.

Figure 2:
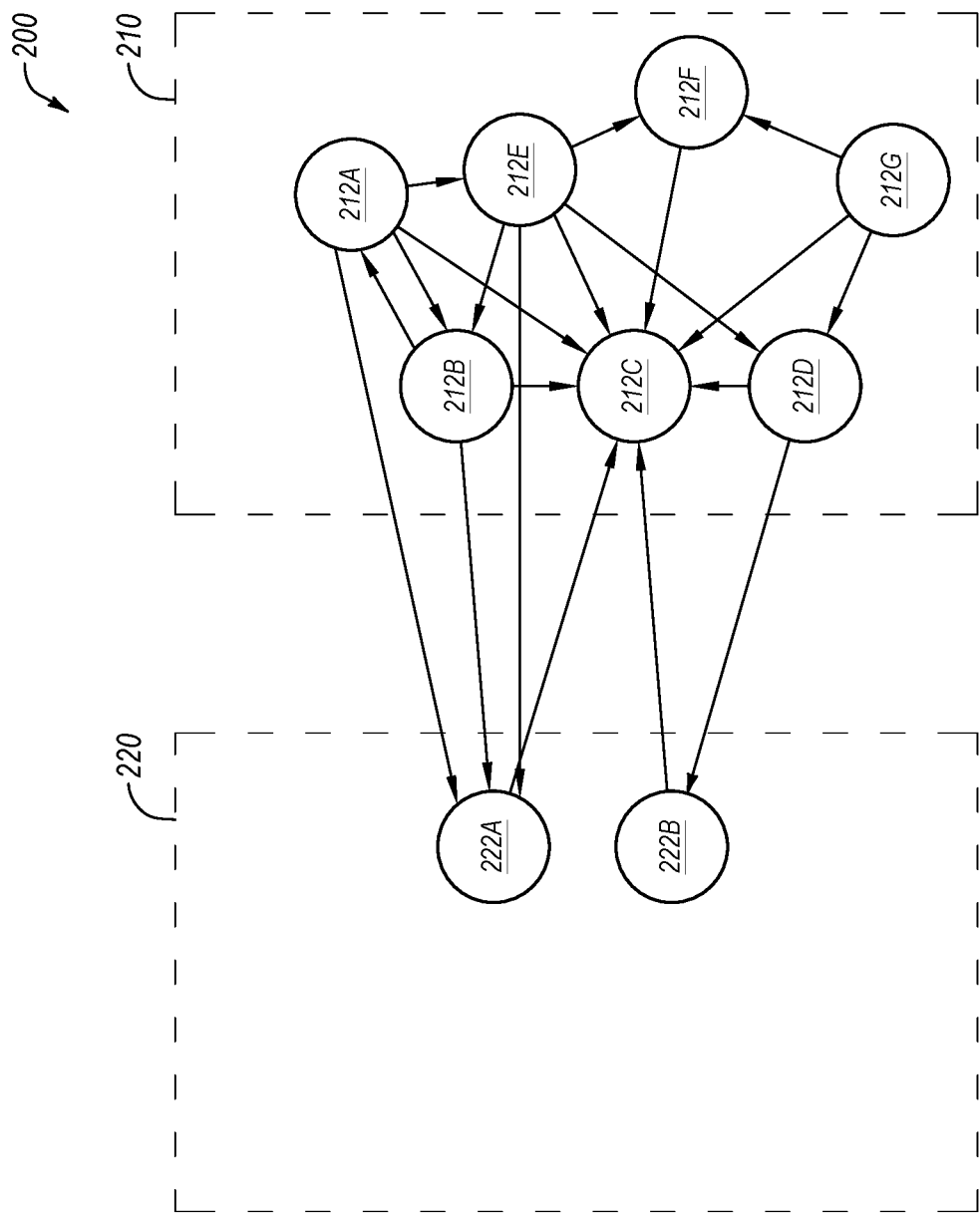
FIG. 2 depicts an example schematic representation of generating a candidate set of social media accounts.

FIG. 2 illustrates an example schematic representation 200 of generating a candidate set of social media accounts, in accordance with one or more embodiments of the present disclosure. In some embodiments, schematic representation 200 may illustrate a process or a portion of a process to identify social media accounts as candidates (also referred to herein as "candidate accounts") for knowledgeable social media accounts. In these and other embodiments, a portion of a process illustrated by schematic representation 200 may be an example of the operation of system 100 of FIG. 1. For example, in some embodiments, an information collection system 110 may be configured to generate the candidate set as illustrated in schematic representation 200.

As illustrated in FIG. 2, a set of seed social media accounts 210 may include one or more social media accounts 212A-212G (referred generally to as seed social media account(s) 212). Set of seed social media accounts 210 may include seed social media accounts 212 known to be social media accounts knowledgeable about a given topic. For example, using a process such as disclosed in U.S. patent application Ser. No. 15/236,183, an author of a publication on a given topic may have a social media account associated with that author. The social media account associated with the author may be a social media account of a person knowledgeable on the topic of the publication. Such a social media account may be included as one of seed social media accounts 212. Additionally or alternatively, some domain-specific accounts already known by users may be added to the seed social media accounts 212. Any other method or process may be utilized to identify the seed social media accounts 212, such as peer review, peer recommendation, university faculty identification, organization identification, or the like.

The arrows associated with seed social media accounts 212 may indicate social media accounts linked to seed social media accounts 212. For example, arrows going away from a given social media account may indicate social media accounts from which the given social media account obtains information, or social media accounts followed by the given social media account. Arrows going towards a given social media account may indicate social media accounts that obtain information from the given social media account, or social media accounts following the given social media account. For example, for seed social media account 212A, seed social media account 212A follows social media accounts 222A, 212B, 212C and 212E, and is followed by social media accounts 212B. As another example, for social media account 222A, social media account 222A follows social media account 212C and is followed by social media accounts 212A, 212B, and 212E.

In some embodiments, a candidate set 220 of social media accounts may be generated. For example, candidate set 220 may be generated by fetching the social media account profiles of seed social media accounts 212 and identifying all social media accounts followed by seed social media accounts 212 and these accounts may be added to candidate set 220 as social media accounts 222A and 222B (referred to as social media accounts 222).

In some embodiments, one or more social media accounts may be removed from candidate set 220. For example, candidate set 220 may be analyzed to identify any social media accounts that are already in set of seed social media accounts 210. For example, seed social media account 212A follows the social media account 212B. However, social media account 212B is already in set of seed social media accounts 210, and thus social media account 212B may be removed from candidate set 220.

As another example, one or more of social media accounts 222 may be analyzed to determine whether they are owned by a person, an organization, a publication, a software vendor, a conference, or the like. For example, some conferences may include a Twitter account that generates social media posts that may be pertinent to a given topic, but is not associated with a person knowledgeable on the given topic. As another example, an organization may reference upcoming conferences or publications on a given topic, but is not associated with a person knowledgeable on the given topic. In some embodiments, social media accounts owned by actual people are included in candidate set 220.

Another example of social media accounts 222 removed from candidate set 220 may include social media accounts of general applicability, or generic social media accounts. For example, a popular movie star or political figure may be followed by multiple knowledgeable people on a topic, but that may not indicate that the movie star or political figure is necessarily knowledgeable on the topic. One or more embodiments of the present disclosure may remove such generic social media accounts.

In some embodiments, social media accounts 222 of candidate set 220 may be analyzed to determine whether social media accounts 222 may be included as seed social media accounts 212. In some embodiments, such an analysis may include removing various social media accounts from candidate set 220 and the remaining social media accounts 222 may be added to set of seed social media accounts 210. Additionally or alternatively, additional analysis may be performed on social media accounts 222. In these and other embodiments, with the inclusion of additional seed social media accounts 212, a process using those newly added seed social media accounts may be used to identify further seed social media accounts.

Modifications, additions, or omissions may be made to schematic representation 200 without departing from the scope of the present disclosure. For example, schematic representation 200 may include other sets or groups of social media accounts, such as a set of learner social media accounts. Additionally or alternatively, additional features or details of analyses described with respect to FIG. 2 may be described with reference to FIGS. 3-6.

Figure 3:
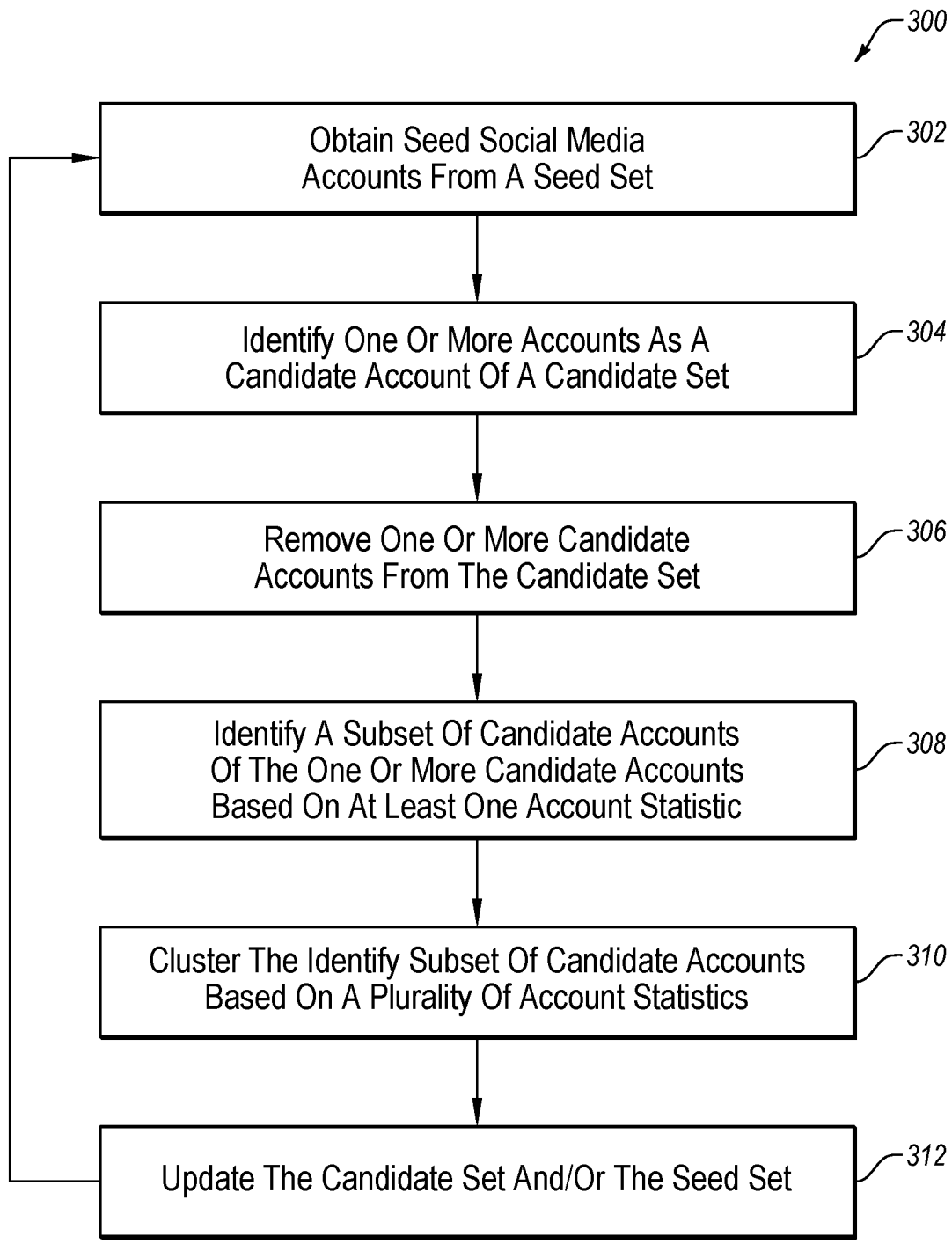
FIG. 3 depicts an example flow diagram of a method of expanding a number of domain-specific accounts.

FIG. 3 illustrates a flowchart of an example method 300 of expanding a number of domain-specific accounts, in accordance with one or more embodiments of the present disclosure. In some embodiments, one or more of the operations associated with method 300 may be performed by the information collection system 110. Alternately or additionally, method 300 may be performed by any suitable system, apparatus, or device. For example, processor 710 of system 700 of FIG. 7 may perform one or more of the operations associated with method 300. Although illustrated with discrete blocks, the steps and operations associated with one or more of the blocks of method 300 may be divided into additional blocks, combined into fewer blocks, or eliminated, depending on the desired implementation.

At block 302, seed social media accounts may be obtained. For example, an information collection system (such as the information collection system 110 of FIG. 1) may be provided a set of predetermined social media accounts that are knowledgeable on a given topic. Additionally or alternatively, the information collection system may identify one or more social media accounts associated with, for example, an author of a publication.

At block 304, one or more accounts followed by at least one seed account may be identified (e.g., extracted) as a candidate account of a candidate set, and method 300 may proceed to block 306. For example, one or more accounts followed by at least one seed social media account of seed social media accounts 212 of set 210 (see FIG. 2) may be extracted as a candidate account. Further, for example, each followed account that is not included in a seed (e.g., seed set 210; see FIG. 2) may be extracted into candidate set 220 as a candidate account. For example, processor 710 (see FIG. 7) may identify (e.g., extract) the one or more accounts as candidate accounts.

In some embodiments, for each identified candidate account in the candidate set, a number of total followers (NTF) (e.g., in an entire social network) and a number of local followers (NLF), which may be a number of followers appearing in the current seed set (as a target set), may be determined. Further, in some embodiments, a measurement, referred to herein as "domain specificity" and defined as NLF/NTF, may be used to selectively filter out general or non-domain-specific accounts (e.g., as background noises) from the candidate set. For example, for a general or non-domain-specific account, such as a celebrity or mainstream media, its NLF appearing in the target set of domain-specific accounts may not be small, however the NLF is only a small proportion of its NTF, and thus its domain specificity may be low. Instead, a domain-specific account is more likely to engage and communicate with other accounts in the same domain, so a large proportion of its total followers may be more likely to come from accounts in the target set of domain-specific accounts, which may lead to a high domain specificity.

At block 306, one or more candidate accounts may be removed from the candidate set, and method 300 may proceed to block 308. More specifically, for example, potentially "noisy" social media accounts included in the candidate set (e.g., set 220) may be filtered out. For example an account that has low number of local followers (NLF) may not be a domain-specific account, and thus may be filtered out. In some embodiments, consideration of multiple data points (e.g., endorsements) may be beneficial in identifying and removing possible "noisy" accounts. Thus, in some embodiments, candidate accounts with a NLF less than a threshold (e.g., 5 NLFs, 10 NLFs, 20 NLFs, etc.) may be removed from the candidate set. Therefore, as an example, an owner of a candidate account may be a personal friend of an owner of a seed account, but the candidate account does not have a NLF equal to or greater than the threshold, and may not be considered a domain-specific account. Therefore, the candidate account may be removed from the candidate set. In some embodiments, an account removed from the candidate set may be added back to the candidate set upon establishing a sufficient number of links from newly added seed accounts. For example, processor 710 (see FIG. 7) may remove (e.g., filter) the one or more candidate accounts from the candidate set.

At block 308, a subset of candidate accounts of the one or more candidate accounts may be identified based on at least one account statistic, and method 300 may proceed to block 310. For example, processor 710 (see FIG. 7) may identify the number of accounts. For example, a number of accounts may be identified based on NLFs, NTFs, or both. More specifically, for example, candidate accounts may sorted (e.g., via one of plurality of sorting methods) based on at least one account statistic (e.g., NLF, NTF, or both), and a top N accounts may be identified.

For example, candidate accounts may be sorted by NLF/NTF (e.g., from greatest to lowest). In this sorting example, top candidate accounts may be accounts that have low NTFs (e.g., less important candidate accounts). Although this sorting method may provide high precision, important domain-specific accounts may not be identified until late sorting rounds, and specific important accounts may not be identified, even after multiple rounds.

As another example, candidate accounts may be sorted by NLFs (e.g., from greatest to lowest). In this sorting example, top candidate accounts may be accounts that have high NTFs (e.g., more important candidate accounts), and thus important domain-specific accounts may be identified early (e.g., in early rounds). However, one or more popular general and/or non-domain-specific accounts may be identified as top candidate accounts.

In some embodiments wherein candidate accounts are sorted via NLFs (e.g., for earlier coverage of important domain-specific accounts), non-domain-specific accounts may be filtered using, for example, NLF/NTF.

At block 310, the subset of candidate accounts (e.g., the accounts identified at block 308) may be clustered based on one or more account statistics (e.g., NLF/NTF), and method 300 may proceed to block 312. More specifically, for example, each top N candidate account (e.g., based on a sorting method) may be clustered based on its NLF/NTF. For example, processor 710 (see FIG. 7) may cluster the number of accounts.

Figure 4:
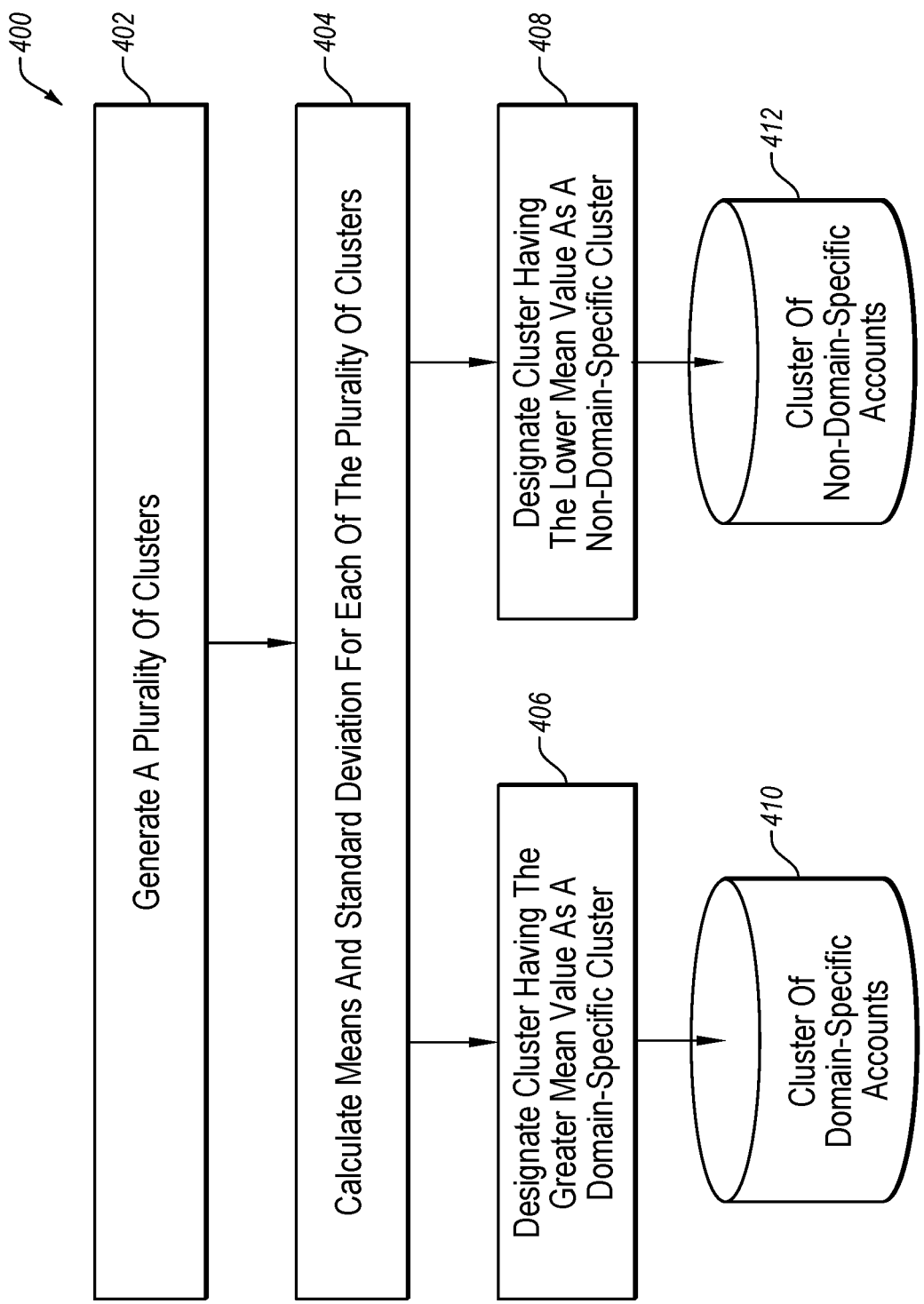
FIG. 4 is a diagram of an example flow that may be used to cluster candidate accounts.

For example, with reference to FIG. 4, an example flow 400 that may be used to cluster candidate accounts, in accordance with one or more embodiments of the present disclosure, is shown. In some embodiments, one or more of the operations associated with flow 400 may be performed by information collection system 110. Alternately or additionally, flow 400 may be performed by any suitable system, apparatus, or device. For example, processor 710 of system 700 of FIG. 7 may perform one or more of the operations associated with flow 400. Although illustrated with discrete blocks, the steps and operations associated with one or more of the blocks of flow 400 may be divided into additional blocks, combined into fewer blocks, or eliminated, depending on the desired implementation.

At block 402, a plurality of clusters may be generated based on a plurality of account statistics. More specifically, for example, each candidate account of the subset of candidate accounts may be clustered based on one or more account statistics (e.g., NLF/NTF). For example, the plurality (e.g., two) of clusters may be generated via one or more clustering methods. More specifically, a first cluster may be generated via log(NLF/NTF) and a clustering method (e.g., k-means clustering method or a Gaussian Mixture Model (GMM) clustering method), and a second cluster may be generated via log(NLF/NTF) and a clustering method.

At block 404, means and standard deviation of each of the plurality of clusters may be calculated. For example, processor 710 (see FIG. 7) may calculate the means and standard deviation of each of the plurality of clusters.

Further, in an embodiment wherein the plurality of clusters includes two clusters, at block 406, the cluster with the greater mean value may be designated as a domain-specific cluster 410, and, at block 408, the cluster with the lower mean value may be designated as a non-domain-specific cluster 412.

Modifications, additions, or omissions may be made to flow 400 without departing from the scope of the present disclosure. For example, the operations of flow 400 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Figure 5:
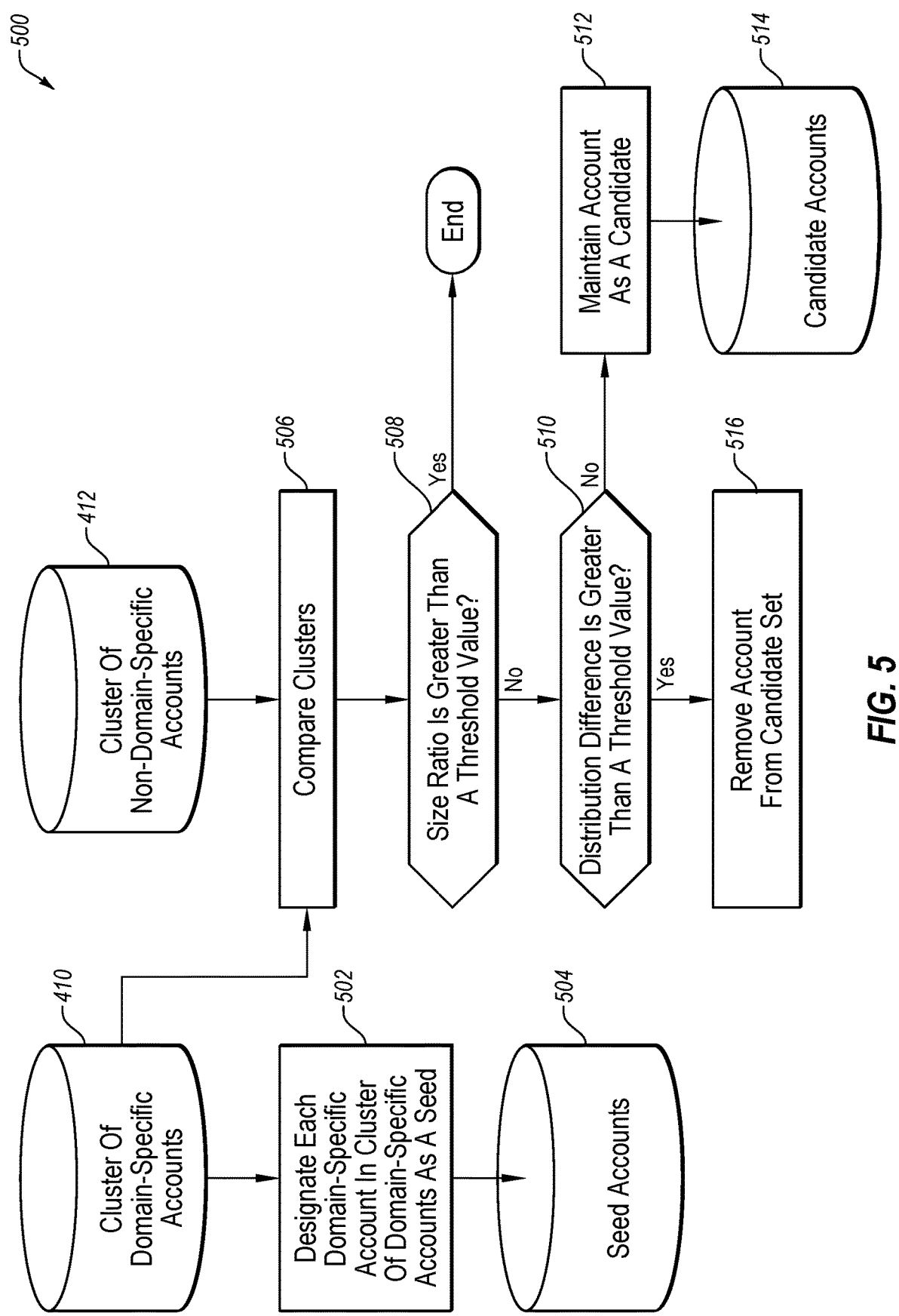
FIG. 5 is a diagram of an example flow that may be used to update seed accounts and/or candidate accounts.

Returning to FIG. 3 at block 312, seed accounts and/or candidate accounts may be updated. For example, FIG. 5 depicts an example flow 500 that may be used to update seed accounts and/or candidate accounts, in accordance with one or more embodiments of the present disclosure. In some embodiments, one or more of the operations associated with flow 500 may be performed by the information collection system 110. Alternately or additionally, flow 500 may be performed by any suitable system, apparatus, or device. For example, processor 710 of system 700 of FIG. 7 may perform one or more of the operations associated with flow 500. Although illustrated with discrete blocks, the steps and operations associated with one or more of the blocks of flow 500 may be divided into additional blocks, combined into fewer blocks, or eliminated, depending on the desired implementation.

At block 502, each domain-specific account of domain-specific cluster 410 may be designated as a seed account (e.g., seed social media account) and added to set of seed accounts 504. For example, each domain-specific account of domain-specific cluster 410 may be removed from a candidate set and added to set of seed accounts 504. For example, set of seed accounts 504 may include set of seed social media accounts 210 of FIG. 2.

At block 506, domain-specific cluster 410 and non-domain-specific cluster 412 may be compared, and flow 500 may proceed to block 504. In some embodiments, for example, a size ratio of the two clusters may be determined. More specifically, a size of non-domain-specific cluster 412 may be compared to a size of domain-specific cluster 410 to determine a size ratio of, for example, non-domain-specific cluster 412 relative to domain-specific cluster 410.

Alternately or additionally, based on the comparison, a distribution difference for each candidate account of non-domain-specific cluster 412 relative to domain-specific cluster 410 may be determined. More specifically, a mean for each candidate account in non-domain-specific cluster 412 may be calculated. Further, log(NLF/NTF) for each candidate account in domain-specific cluster 410 may be calculated, and an average mean for domain-specific cluster 410 may be calculated. Moreover, for non-domain-specific cluster 412, a mean may be compared to the mean of domain-specific cluster 410.

At block 508, a determination may be made as to whether a size ratio of the two clusters is greater than a threshold. For example, it may be determined whether the size of non-domain-specific cluster 412/size of domain-specific cluster 410 is larger than a threshold value (e.g., 0.4, 0.5, 0.6, etc.). If it is determined that the size ratio of the two clusters is greater than the threshold value, flow 500 may end. If it is determined that the size ratio of the two clusters is not greater than the threshold value, flow 500 may proceed to block 510.

At block 510, a determination may be made as to whether a distribution difference for a candidate account of non-domain-specific cluster 412 is greater than a threshold value. For example, processor 710 (see FIG. 7) may determine whether the distribution difference for a candidate account of non-domain-specific cluster 412 is greater than a threshold value. For example, if log(NLF/NTF) of a candidate account of non-domain-specific cluster 412 and the mean of domain-specific cluster 410 is greater than a threshold value (e.g., magnitude order difference of more than 3 (e.g., of mean values)), flow 500 may proceed to block 516 wherein the candidate account may be removed from a candidate set permanently (e.g., candidate set 220) and may be added into the candidate set again. If the difference between log(NLF/NTF) of the candidate account of non-domain-specific cluster 412 and the mean of domain-specific cluster 410 is less than or equal to a threshold value, flow 500 may proceed to block 512 wherein the candidate account of non-domain-specific cluster 412 may remain in the set of candidate accounts. For example, set of candidate accounts 514 may include candidate set 220 of FIG. 2. According to some embodiments, an act at block 510 may be repeated for each candidate account in non-domain-specific cluster 412.

Modifications, additions, or omissions may be made to flow 500 without departing from the scope of the present disclosure. For example, the operations of flow 500 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Figure 6:
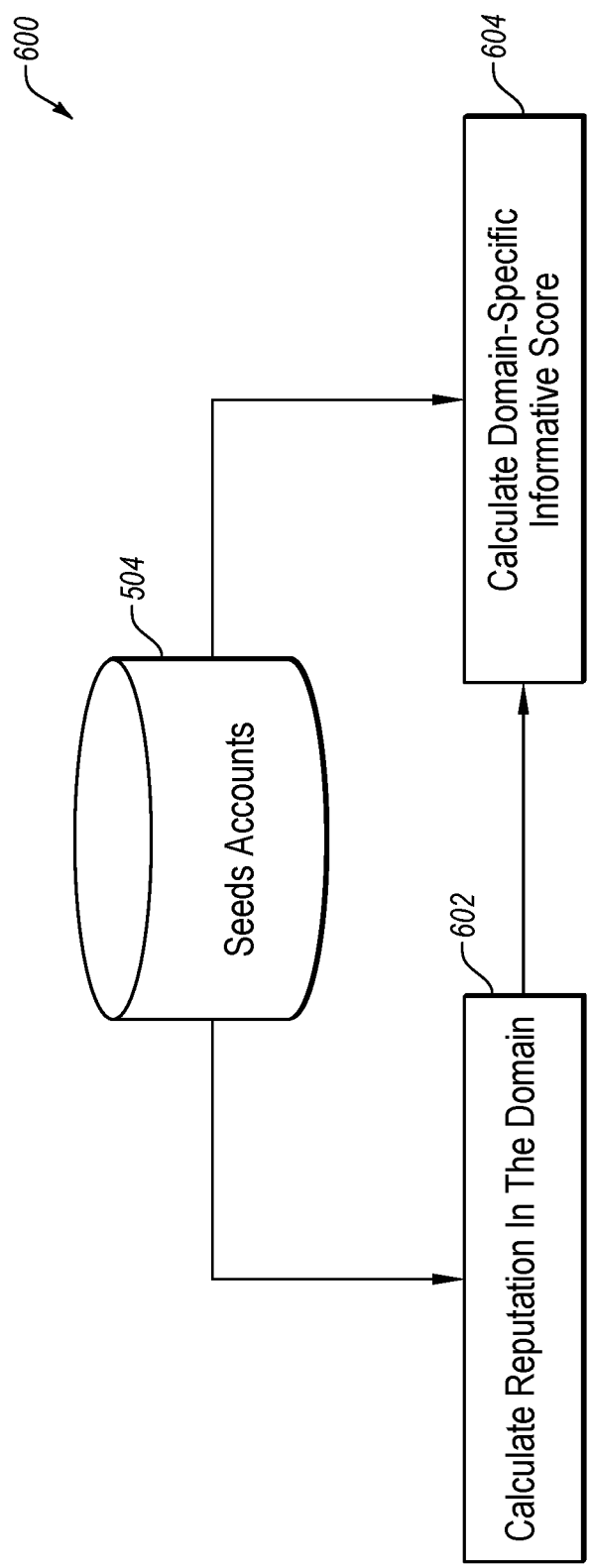
FIG. 6 is a diagram of an example flow that may be used to identify experts in a domain.

According to various embodiments, method 300 may be repeated more than once (e.g., more than one round) to expand a number of seed accounts and/or candidate accounts. Thus, in some embodiments, method 300 may proceed from 312 to block 302. Further, modifications, additions, or omissions may be made to method 300 without departing from the scope of the present disclosure. For example, the operations of method 300 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment FIG. 6 is a diagram of an example flow 600 that may be used to identify experts of a domain, according to at least one embodiment described herein. In some embodiments, flow 600 may be configured to illustrate a process to identify experts in a domain. In these and other embodiments, a portion of flow 600 may be an example of the operation of system 100 of FIG. 1 and/or system 700 of FIG. 7.

Flow 600 may begin at block 602, wherein for each seed account in set of seed accounts (e.g., seed accounts 504), a reputation in the relevant domain may be determined. For example, the reputation may be determined based on a determined a PageRank of a seed account (e.g., based on a network connection of seed accounts).

At block 604, based on the determined reputation at block 602, for each seed account in the set of seed accounts (e.g., seed accounts 504), a domain-specific informative score may be determined. More specifically, for example, based on mutually reinforcing relationship (MRR) between accounts and contents, each seed account in the set of seed accounts may be ranked to determine a ranking of informative sources of domain-specific content.

An example method identifying experts based on one or more purpose is described with respect to U.S. patent application Ser. No. 15/653,356. The entirety of U.S. patent application Ser. No. 15/653,356, is hereby incorporated by reference.

Modifications, additions, or omissions may be made to flow 600 without departing from the scope of the present disclosure. For example, the operations of flow 600 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Figure 7:
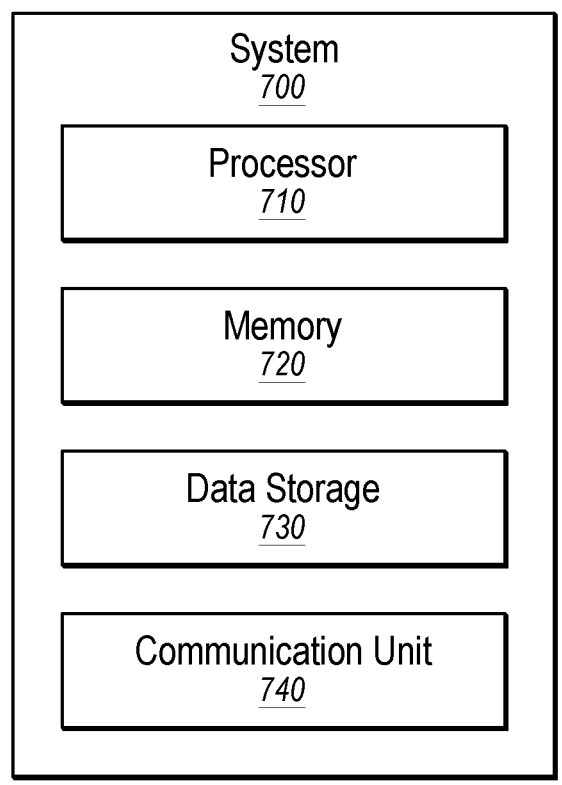
FIG. 7 is a block diagram of an example computing system.

FIG. 7 illustrates an example system 700, according to at least one embodiment described herein. System 700 may include any suitable system, apparatus, or device configured to test software. System 700 may include a processor 710, a memory 720, a data storage 730, and a communication device 740, which all may be communicatively coupled. Data storage 730 may include various types of data, such as author objects, social media account objects, matched accounts, seed accounts, candidate accounts, etc.

Generally, processor 710 may include any suitable special-purpose or general-purpose computer, computing entity, or processing device including various computer hardware or software modules and may be configured to execute instructions stored on any applicable computer-readable storage media. For example, processor 710 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 7, it is understood that processor 710 may include any number of processors distributed across any number of network or physical locations that are configured to perform individually or collectively any number of operations described herein. In some embodiments, processor 710 may interpret and/or execute program instructions and/or process data stored in memory 720, data storage 730, or memory 720 and data storage 730. In some embodiments, processor 710 may fetch program instructions from data storage 730 and load the program instructions into memory 720.

After the program instructions are loaded into memory 720, processor 710 may execute the program instructions, such as instructions to perform method 300, flow 400, flow 500, and/or flow 600 as described herein. For example, processor 710 may create the author objects and the social media account objects using information from publication systems and social media systems, respectively. Processor 710 may compare the information from the author objects and the social media account objects to identify social media accounts associated with authors from the author objects. Further, via seed expansion, processor 710 may identify domain-specific accounts.

Memory 720 and data storage 730 may include computer-readable storage media or one or more computer-readable storage mediums for carrying or having computer-executable instructions or data structures stored thereon. Such computer-readable storage media may be any available media that may be accessed by a general-purpose or special-purpose computer, such as processor 710.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 710 to perform a certain operation or group of operations.

Communication unit 740 may include any component, device, system, or combination thereof that is configured to transmit or receive information over a network. In some embodiments, communication unit 740 may communicate with other devices at other locations, the same location, or even other components within the same system. For example, communication unit 740 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. Communication unit 740 may permit data to be exchanged with a network and/or any other devices or systems described in the present disclosure. For example, communication unit 740 may allow system 700 to communicate with other systems, such as publication systems 120, social media systems 130, and device 140 of FIG. 1.

Modifications, additions, or omissions may be made to system 700 without departing from the scope of the present disclosure. For example, data storage 730 may be multiple different storage mediums located in multiple locations and accessed by processor 710 through a network.

As indicated above, the embodiments described herein may include the use of a special purpose or general purpose computer (e.g., processor 710 of FIG. 7) including various computer hardware or software modules, as discussed in greater detail below. Further, as indicated above, embodiments described herein may be implemented using computer-readable media (e.g., memory 720 or data storage 730 of FIG. 7) for carrying or having computer-executable instructions or data structures stored thereon.

As used herein, the terms "module" or "component" may refer to specific hardware implementations configured to perform the operations of the module or component and/or software objects or software routines that may be stored on and/or executed by, for example, system 100 and/or computing system 700. In some embodiments, the different components and modules described herein may be implemented as objects or processes that execute on a computing system (e.g., as separate threads). While some of the system and methods described herein are generally described as being implemented in software (stored on and/or executed by system 700), specific hardware implementations or a combination of software and specific hardware implementations are also possible and contemplated. In this description, a "computing entity" may include any computing system as defined herein, or any module or combination of modules running on a computing system, such as system 700.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of identifying domain-specific accounts, the method comprising:
    identifying, via at least one processor, a plurality of candidate accounts that are followed by a plurality of seed accounts, the seed accounts representative of accounts identified as including knowledge for a particular domain;
    identifying, via the at least one processor, a subset of candidate accounts of the plurality of candidate accounts based on account statistics, the account statistics comprising, for a given candidate account: a ratio between a number of followers from among the seed accounts following the given candidate account and a total number of all followers following the given candidate account;
    clustering, via the at least one processor, each candidate account of the subset of candidate accounts into either a first cluster or a second cluster of candidate accounts, the clustering performed based on the account statistics comprising, for the given candidate account: the ratio between the number of followers from among the seed accounts following the given candidate account and the total number of all followers following the given candidate account;
    identifying the first cluster as a non-domain-specific cluster and the second cluster as a domain-specific cluster based on a second cluster mean value of the account statistics of accounts of the second cluster being higher than a first cluster mean value of the account statistics of accounts of the first cluster, the account statistics comprising, for the given candidate account: the ratio between the number of followers from among the seed accounts following the given candidate account and the total number of all followers following the given candidate account; and
    identifying each account of the domain-specific cluster as a domain-specific account for the particular domain.

2. The method of claim 1, further comprising filtering the plurality of candidate accounts based on at least one of the account statistics.

3. The method of claim 2, wherein the filtering comprises removing each candidate account of the plurality of candidate accounts having a number of local followers (NLF) less than a threshold value.

4. The method of claim 1, wherein identifying the subset of candidate accounts of the plurality of candidate accounts based on the account statistics comprises:
    sorting the plurality of candidate accounts based on a number of local followers (NLF); and
    selecting a top N accounts from the sorted plurality of candidate accounts as the subset of candidate accounts.

5. The method of claim 1, the method further comprising:
    identifying each account of the domain-specific cluster as a seed account of the plurality of seed accounts;
    determining whether a size ratio of the non-domain-specific cluster relative to the domain-specific cluster is greater than a first threshold value;
    in response to determining the size ratio of the non-domain-specific cluster relative to the domain-specific cluster is greater than the first threshold value, determining whether a distribution difference between a candidate account of the non-domain-specific cluster and the domain-specific cluster is greater than a second threshold value;
    in response to determining the distribution difference between the candidate account of the non-domain-specific cluster and the domain-specific cluster is greater than the second threshold value, identifying the candidate account as a non-candidate account; and
    in response to determining the distribution difference between the candidate account of the non-domain-specific cluster and the domain-specific cluster is less than or equal to the second threshold value, identifying the candidate account as a candidate account of the plurality of candidate accounts.

6. The method of claim 1, wherein identifying the plurality of candidate accounts that are followed by the plurality of seed accounts comprises:
    identifying each account followed by each seed account of the plurality of seed accounts; and
    identifying each followed account not included in the plurality of seed accounts as a candidate account of the plurality of candidate accounts.

7. The method of claim 1, further comprising identifying the seed accounts based on the seed accounts being determined to be knowledgeable regarding a topic.

8. The method of claim 7, wherein the seed accounts are determined to be knowledgeable regarding the topic based on an association between the seed accounts and one or more publications regarding the topic.

9. The method of claim 8, wherein the association between the seed accounts and one or more publications regarding the topic comprises an owner of each of the seed accounts being an author of the one or more publications.

10. A system, comprising:
    at least one processor; and
    at least one non-transitory computer-readable medium containing instructions that, when executed by the at least one processor, are configured to cause the system to perform operations, the operations comprising:
        identifying a plurality of candidate accounts that are followed by a plurality of seed accounts, the seed accounts representative of accounts identified as including knowledge for a particular domain;
        identifying a subset of candidate accounts of the plurality of candidate accounts based on account statistics, the account statistics comprising, for a given candidate account: a ratio between a number of followers from among the seed accounts following the given candidate account and a total number of all followers following the given candidate account;
        clustering each candidate account of the subset of candidate accounts into either a first cluster or a second cluster of candidate accounts, the clustering performed based on the account statistics comprising, for the given candidate account: the ratio between the number of followers from among the seed accounts following the given candidate account and the total number of all followers following the given candidate account;

identifying the first cluster as a non-domain-specific cluster and the second cluster as a domain-specific cluster based on a second cluster mean value of the account statistics of accounts of the second cluster being higher than a first cluster mean value of the account statistics of accounts of the first cluster, the account statistics comprising, for the given candidate account: the ratio between the number of followers from among the seed accounts following the given candidate account and the total number of all followers following the given candidate account; and identifying each account of the domain-specific cluster as a domain-specific account for the particular domain.

11. The system of claim 10, wherein the operations further comprise filtering the plurality of candidate accounts based on at least one of the account statistics.

12. The system of claim 11, wherein the operations further comprise removing each candidate account of the plurality of candidate accounts having a number of local followers (NLF) less than a threshold value to filter the plurality of candidate accounts.

13. The system of claim 10, wherein the operations further comprise:

sorting the plurality of candidate accounts based on a number of local followers (NLF); and selecting a top N accounts from the sorted plurality of candidate accounts as the subset of candidate accounts to identify the subset of candidate accounts of the plurality of candidate accounts.

14. The system of claim 10, wherein the operations further comprise:

identifying each account of the domain-specific cluster as a seed account of the plurality of seed accounts;

determining whether a size ratio of the non-domain-specific cluster relative to the domain-specific cluster is greater than a first threshold value;

in response to the size ratio of the non-domain-specific cluster relative to the domain-specific cluster being greater than the first threshold value, determining whether a distribution difference between a candidate account of the non-domain-specific cluster and the domain-specific cluster is greater than a second threshold value;

in response to the distribution difference between the candidate account of the non-domain-specific cluster and the domain-specific cluster being greater than the second threshold value, identifying the candidate account as a non-candidate account; and in response to the distribution difference between the candidate account of the non-domain-specific cluster and the domain-specific cluster being less than or equal to the second threshold value, identifying the candidate account as a candidate account of the plurality of candidate accounts.

15. The system of claim 10, wherein the operations further comprise:

identifying each account followed by each seed account of the plurality of seed accounts; and identifying each followed account not included in the plurality of seed accounts as a candidate account of the plurality of candidate accounts.

16. One or more non-transitory computer-readable media that include instructions that, when executed by one or more processing systems, are configured to cause the processing system to perform operations, the operations comprising:

identifying a plurality of candidate accounts that are followed by a plurality of seed accounts, the seed accounts representative of accounts identified as including knowledge for a particular domain;

identifying a subset of candidate accounts of the plurality of candidate accounts based on account statistics, the account statistics comprising, for a given candidate account: a ratio between a number of followers from among the seed accounts following the given candidate account and a total number of all followers following the given candidate account;

clustering each candidate account of the subset of candidate accounts into either a first cluster or a second cluster of candidate accounts, the clustering performed based on the account statistics comprising, for the given candidate account: the ratio between the number of followers from among the seed accounts following the given candidate account and the total number of all followers following the given candidate account;

identifying the first cluster as a non-domain-specific cluster and the second cluster as a domain-specific cluster based on a second cluster mean value of the account statistics of accounts of the second cluster being higher than a first cluster mean value of the account statistics of accounts of the first cluster, the account statistics comprising, for the given candidate account: the ratio between the number of followers from among the seed accounts following the given candidate account and the total number of all followers following the given candidate account;

and identifying each account of the domain-specific cluster as a domain-specific account for the particular domain.

17. The computer-readable media of claim 16, the operations further comprising filtering the plurality of candidate accounts based on at least one of the account statistics.

18. The computer-readable media of claim 17, wherein filtering comprises removing each candidate account of the plurality of candidate accounts having a number of local followers (NLF) less than a threshold value.

19. The computer-readable media of claim 16, wherein identifying the subset of candidate accounts of the plurality of candidate accounts based on the account statistics comprises:

sorting the plurality of candidate accounts based on a number of local followers (NLF); and selecting a top N accounts from the sorted plurality of candidate accounts as the subset of candidate accounts.

20. The computer-readable media of claim 16, the operations further comprising:

identifying each account of the domain-specific cluster as a seed account of the plurality of seed accounts;

determining whether a size ratio of the non-domain-specific cluster relative to the domain-specific cluster is greater than a first threshold value;

in response to determining the size ratio of the non-domain-specific cluster relative to the domain-specific cluster is greater than the first threshold value, determining whether a distribution difference between a candidate account of the non-domain-specific cluster and the domain-specific cluster is greater than a second threshold value;

in response to determining the distribution difference between the candidate account of the non-domain-specific cluster and the domain-specific cluster is greater than the second threshold value, identifying the candidate account as a non-candidate account; and in response to determining the distribution difference between the candidate account of the non-domain-specific cluster and the domain-specific cluster is less than or equal to the second threshold value, identifying the candidate account as a candidate account of the plurality of candidate accounts.

* * * * *